US011981133B2

(12) United States Patent
Iwahashi et al.

(10) Patent No.: US 11,981,133 B2
(45) Date of Patent: May 14, 2024

(54) LIQUID DISCHARGE HEAD SUBSTRATE AND PRINTING APPARATUS

(71) Applicant: CANON KABUSHIKI KAISHA, Tokyo (JP)

(72) Inventors: Shinya Iwahashi, Kanagawa (JP); Takeru Yasuda, Kanagawa (JP); Yuzuru Ishida, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 42 days.

(21) Appl. No.: 17/708,730

(22) Filed: Mar. 30, 2022

(65) Prior Publication Data

US 2022/0314619 A1 Oct. 6, 2022

(30) Foreign Application Priority Data

Apr. 6, 2021 (JP) ................................ 2021-064795

(51) Int. Cl.
*B41J 2/14* (2006.01)

(52) U.S. Cl.
CPC ......... *B41J 2/14088* (2013.01); *B41J 2/1404* (2013.01); *B41J 2/14072* (2013.01); *B41J 2/14129* (2013.01); *B41J 2202/18* (2013.01)

(58) Field of Classification Search
CPC .. B41J 2/14088; B41J 2/1404; B41J 2/14072; B41J 2/14129; B41J 2202/18
See application file for complete search history.

(56) References Cited

U.S. PATENT DOCUMENTS

| | | | | |
|---|---|---|---|---|
| 9,085,143 | B2 | 7/2015 | Ishida et al. | |
| 9,096,059 | B2 | 8/2015 | Hatsui et al. | |
| 9,751,301 | B2 | 9/2017 | Takahashi et al. | |
| 10,543,685 | B2 * | 1/2020 | Naruse .................. | B41J 2/1601 |

FOREIGN PATENT DOCUMENTS

| | | | |
|---|---|---|---|
| JP | 9-1803 | A | 1/1997 |

* cited by examiner

*Primary Examiner* — Geoffrey S Mruk
(74) *Attorney, Agent, or Firm* — VENABLE LLP

(57) ABSTRACT

A substrate includes a layer including a base material and an intermediate layer including a wiring layer, an element formed on a side of the intermediate layer, and configured to generate energy for discharging a liquid, an insulating layer covering the element and the layer against a liquid chamber, and a conductive layer formed on the insulating layer so as to cover the element against the liquid chamber. The substrate further includes an electric connecting portion configured to electrically connect the wiring layer and the element, a non-insulated portion formed on a side of the intermediate layer and configured to be covered by the insulating layer against the liquid chamber, and an opening portion formed in the insulating layer at a position. The non-insulated portion is connected to the conductive layer via the opening portion.

19 Claims, 11 Drawing Sheets

LIQUID DISCHARGE HEAD SUBSTRATE AND PRINTING APPARATUS

BACKGROUND OF THE INVENTION

Field of the Invention

The present invention relates to a liquid discharge head substrate.

Description of the Related Art

As an apparatus including a liquid discharge head, a printing apparatus that performs printing by discharging ink to a print medium is known. A thermal method is known as one of liquid discharge methods in such a printing apparatus. In the thermal method, the heat energy generated by the heat generating resistive element induces a foaming phenomenon of a liquid, and this is utilized to discharge the liquid.

There is known a technique in which, in order to protect an element that generates energy for discharging a liquid, a protection layer is interposed between the liquid and the element. For example, in a case of the above-described thermal method, it is known that, in order to protect the heat generating resistive element from heat and physical and chemical impacts during foaming and defoaming of the liquid, the heat generating resistive element is covered by a protection layer (anti-cavitation layer). The protection layer is generally formed of a metal material, and forms a conductive layer. The conductive layer is provided on an insulating layer between the heat generating resistive element and the protection layer. Japanese Patent Laid-Open No. 9-1803 proposes that, in order to decrease the probability of dielectric breakdown of the insulating layer due to ESD (Electro Static Discharge) and the like, the arrangement range of the protection layer is decreased.

When the film thickness of the protection layer formed of a metal material is increased, it causes warpage of the substrate. Therefore, it is effective to decrease the film thickness. However, if the film thickness of the conductive layer serving as the protection layer is decreased and the arrangement range thereof is decreased, a place to release the electric charges is readily lost, and dielectric breakdown of the insulating layer due to ESD may occur.

SUMMARY OF THE INVENTION

The present invention provides a technique of decreasing dielectric breakdown of an insulating layer due to ESD.

According to an aspect of the present invention, there is provided a liquid discharge head substrate comprising a substrate configuration layer including a base material and an intermediate layer including a wiring layer, an element formed on a side of the intermediate layer of the substrate configuration layer, and configured to generate energy for discharging a liquid in accordance with supply of power from the wiring layer, an insulating layer covering the element and the substrate configuration layer against a liquid chamber including a discharge port configured to discharge the liquid, and a conductive layer formed on the insulating layer so as to cover the element against the liquid chamber, wherein the wiring layer and the element are formed so as to overlap each other when viewed from a direction in which the liquid is discharged from the discharge port, the liquid discharge head substrate further comprises: an electric connecting portion configured to electrically connect the wiring layer and the element; a non-insulated portion formed on a side of the intermediate layer of the substrate configuration layer and configured to be covered by the insulating layer against the liquid chamber; and an opening portion formed in the insulating layer at a position which is spaced apart from the element and where the opening portion overlaps the conductive layer and the non-insulated portion when viewed from the direction, and the non-insulated portion is connected to the conductive layer via the opening portion.

Further features of the present invention will become apparent from the following description of exemplary embodiments (with reference to the attached drawings).

DESCRIPTION OF THE EMBODIMENTS

Figure 1:
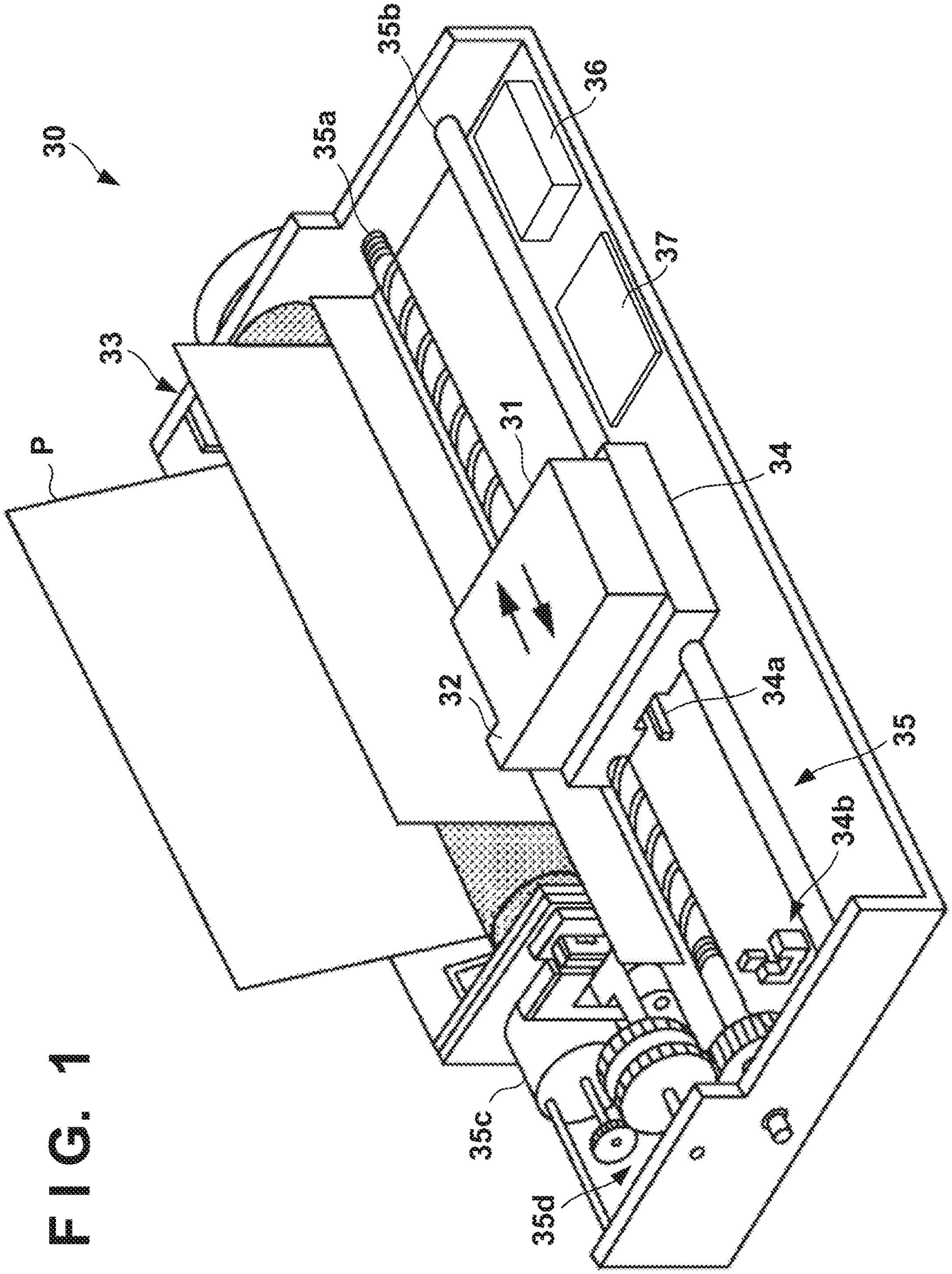
FIG. 1 is a view showing the outer appearance of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view showing the outer appearance of a printing apparatus 30 according to an embodiment of the present invention. The printing apparatus 30 is an inkjet printing apparatus that performs printing on a print medium by discharging ink. Note that "print" includes not only formation of significant information such as a character or graphic pattern but also formation of an image, design, or pattern on print media in a broader sense and processing of print media regardless of whether the information is significant or insignificant or has become obvious to allow human visual perception. Also, in this embodiment, “print medium” is assumed to be sheet-shaped paper but may be a fabric, a plastic film, or the like.

In addition, the printing apparatus to which the present invention can be applied is not limited to the inkjet printing apparatus, and the present invention can also be applied to, for example, a melt type or sublimation type thermal transfer printing apparatus. The printing apparatus may be a manufacturing apparatus configured to manufacture, for example, a color filter, an electronic device, an optical device, a microstructure, or the like by a predetermined printing method. The printing apparatus may be an apparatus for forming a three-dimensional image from 3D data.

The printing apparatus 30 includes an ink tank 31 and a printhead 32, which are formed as one unit, and these are mounted on a carriage 34. The printhead 32 discharges ink stored in the ink tank 31 to a print medium P, thereby performing printing. The carriage 34 can be moved by a drive unit 35 reciprocally in the directions of arrows. The drive unit 35 includes a lead screw 35*a* and a guide shaft 35*b*, which are extended in the moving direction of the carriage 34. The lead screw 35*a* engages with a screw hole (not shown) of the carriage 34, and the carriage 34 moves along with the rotation of the lead screw 35*a*. A motor 35*c* and a gear train 35*d* form the rotation mechanism of the lead screw 35*a*. The guide shaft 35*b* guides the movement of the carriage 34. A photosensor 34*b* configured to detect a detection target piece 34*a* of the carriage 34 is arranged at one end of the moving range of the carriage 34, and the detection result is used to control the movement of the carriage 34.

A conveying unit 33 conveys the print medium P. The conveying unit 33 includes a motor (not shown) that is a drive source, and a conveyance roller (not shown) that is rotated by the drive force of the motor. The print medium P is conveyed along with the rotation of the conveyance roller.

The printing apparatus 30 includes an internal power supply 36 configured to supply power to be consumed by the printing apparatus 30, and a control circuit 37 configured to control the printing apparatus 30. The control circuit 37 causes the units to alternately perform the movement of the printhead 32 by the movement of the carriage 34 and ink discharge, and the conveyance of the print medium P, thereby printing an image on the print medium P.

Figure 2A:
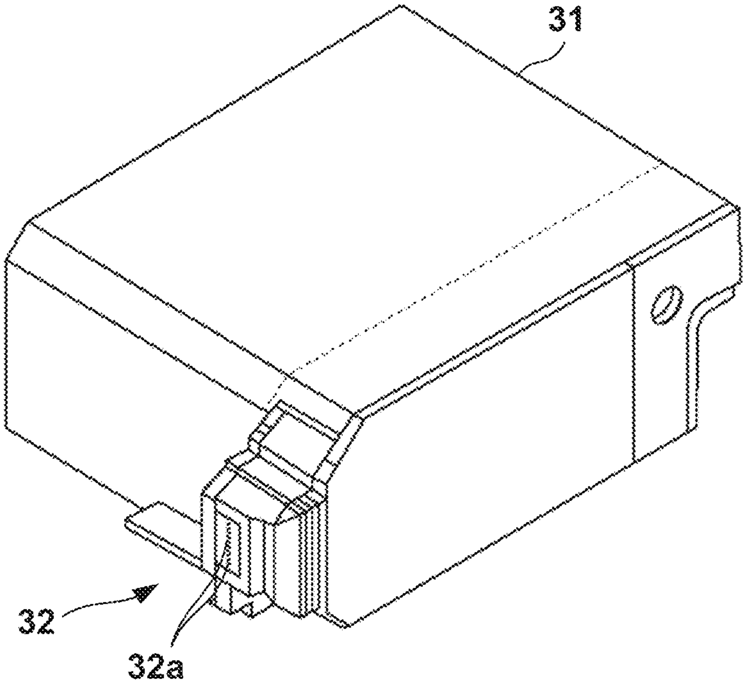
FIG. 2A is a perspective view of the periphery of a printhead.
Figure 2B:
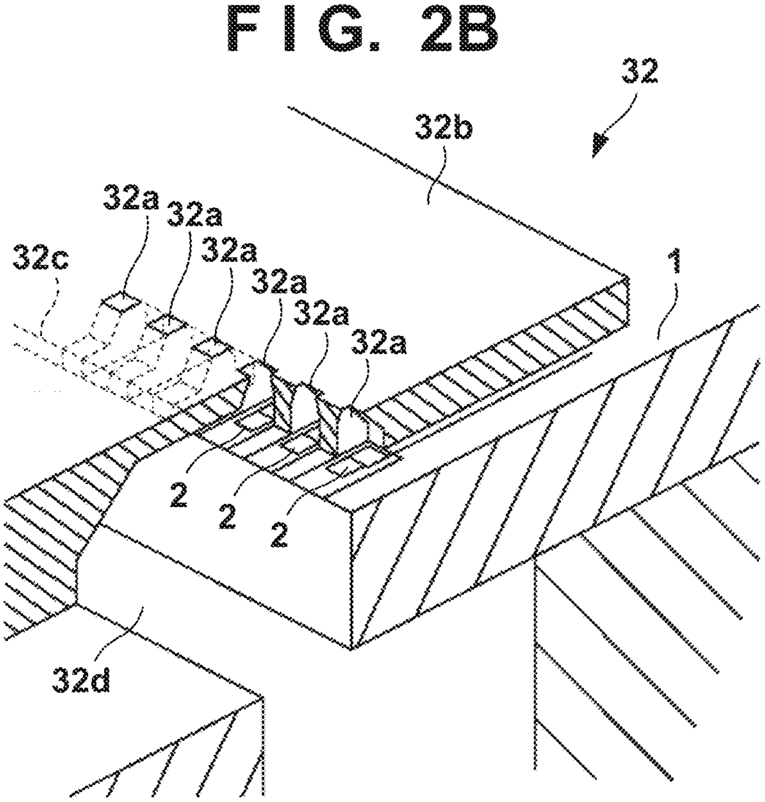
FIG. 2B is a cutaway view of the periphery of ink discharge ports.

FIG. 2A is a perspective view of the ink tank 31 and the printhead 32, which are formed as one unit. The ink tank 31 and the printhead 32 can be separated at the position of a broken line. The printhead 32 includes a plurality of ink discharge ports 32*a* configured to discharge ink. FIG. 2B is a cutaway view of the printhead 32, which shows the structure on the periphery of the ink discharge ports 32*a*.

The printhead 32 includes a flow path forming member 32*b* and an element substrate (liquid discharge head substrate) 1. The flow path forming member 32*b* is provided on the element substrate 1, and forms the ink discharge ports 32*a*, a flow path 32*c* configured to supply ink to the ink discharge ports 32*a* and a common liquid chamber 32*d*. The element substrate 1 is provided with discharge elements 2 corresponding to the ink discharge ports 32*a*. A plurality of the discharge elements 2 are provided. The discharge element 2 according to this embodiment is an element that generates energy for discharging a liquid (ink) in accordance with supply of power, and is particularly a heat generating resistive element (electrothermal transducer). The electrothermal transducer generates heat upon energization to foam ink, and discharges the ink from the ink discharge port 32*a* by the foaming energy. Note that the discharge element 2 may be not an electrothermal transducer but a piezoelectric element.

<Element Substrate>

Figure 3:
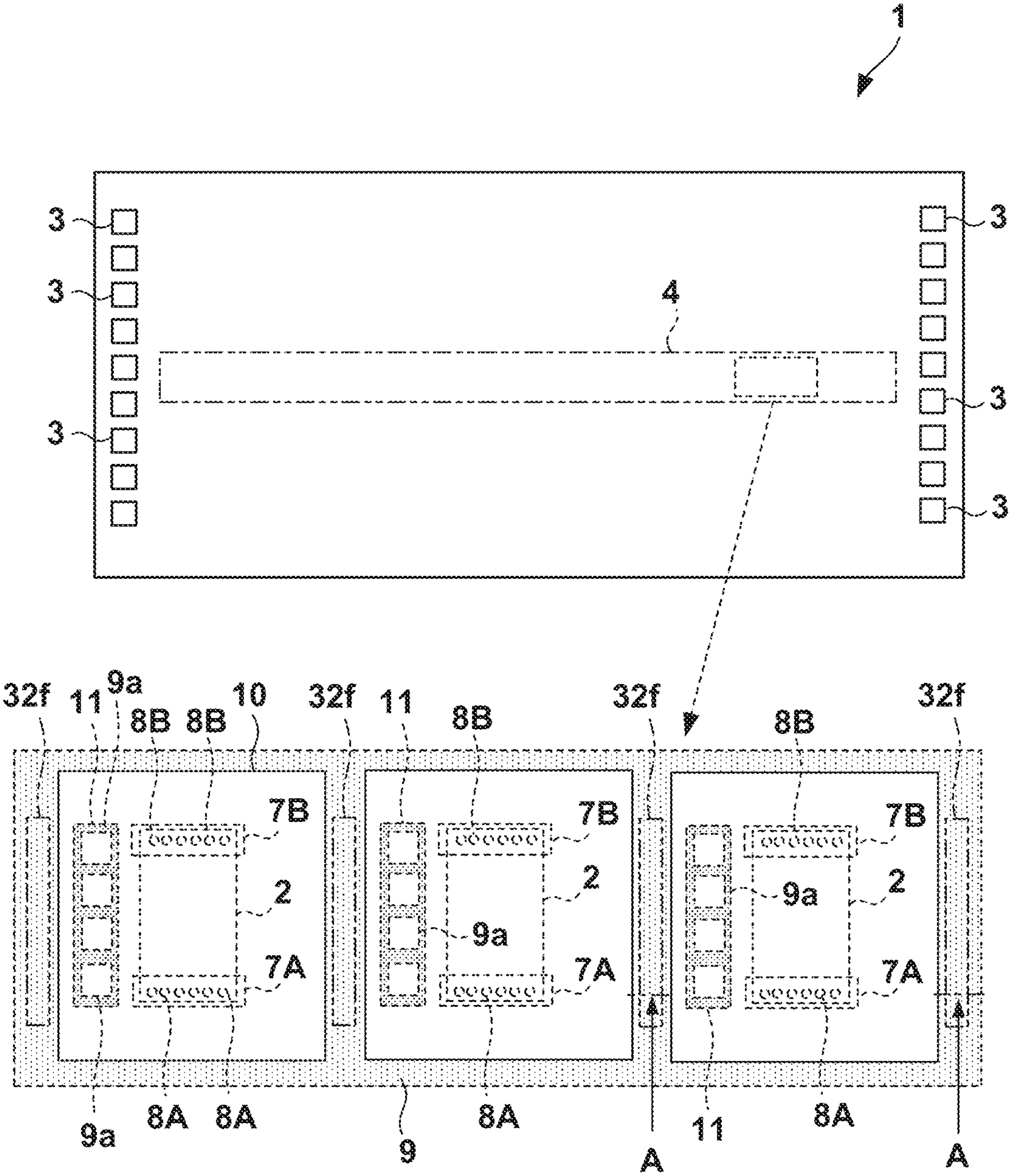
FIG. 3 shows a plan view and a partially enlarged view of an element substrate according to an embodiment of the present invention.

FIG. 3 shows a plan view and a partially enlarged view of the element substrate 1. The element substrate 1 has a rectangular shape in a planar view, and an array of a plurality of electrode pads 3 is formed in each end portion in the longitudinal direction of the element substrate 1. The electrode pad 3 serves as an electrical contact with an external device (the control circuit 37 or the like). In the central portion of the element substrate 1 in the lateral direction, an arrangement region 4 for the discharge elements 2 corresponding to an array of the plurality of ink discharge ports 32*a* is formed. FIG. 3 shows the enlarged view of the periphery of three discharge elements 2 among the plurality of discharge elements 2. The region for each discharge element 2 can be referred to as a pressure generating portion since a pressure for discharging ink is generated therein, so that it can be said that three pressure generating portions are shown in FIG. 3. The arrangement region 4 can be referred to as a pressure generating region since the pressure generating portions as described above are formed in an array in the longitudinal direction of the element substrate 1.

Figure 4:
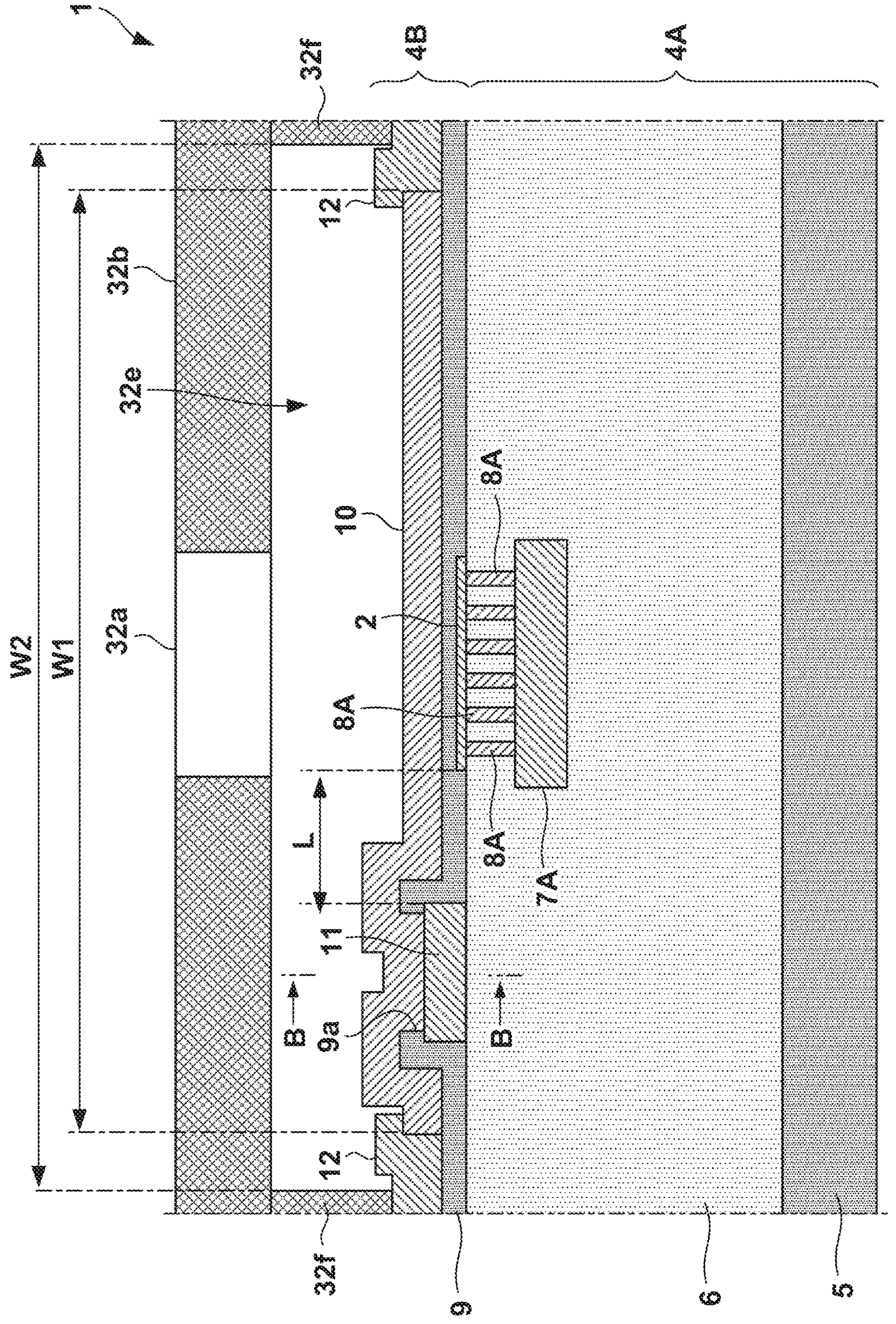
FIG. 4 is a sectional view taken along a line A-A in FIG. 3.
Figure 5:
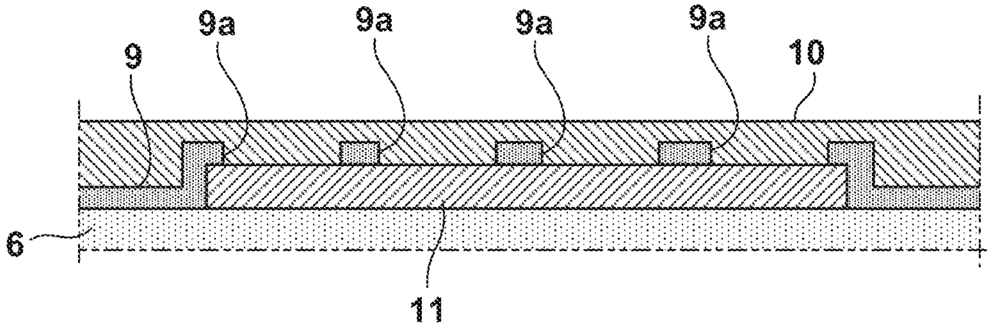
FIG. 5 is a sectional view taken along a line B-B in FIG. 4.

With reference to FIGS. 3 to 5, the arrangement of the element substrate 1 will be further described. FIG. 4 is a sectional view taken along a line A-A in FIG. 3, and FIG. 5 is a sectional view taken along a line B-B in FIG. 4. FIG. 4 shows the flow path forming member 32*b* in addition to the element substrate 1. The flow path forming member 32*b* includes a plurality of wall portions 32*f*. Each liquid chamber (pressure chamber or foam generating chamber) 32*e* including the ink discharge port 32*a* is defined by the wall portions 32*f* and formed on the element substrate 1. Note that in this embodiment, the arrangement will be described in which the flow path forming member 32*b* includes the ink discharge port 32*a*. However, an arrangement in which a discharge port forming member formed with the ink discharge port 32*a* and the flow path forming member including the wall portions 32*f* are formed of different materials or provided as separate members may be used.

The element substrate 1 is roughly divided into a substrate configuration layer 4A and a substrate configuration layer 4B. The substrate configuration layer 4B is located between the substrate configuration layer 4A and the flow path forming member 32*b*. The discharge element 2 is a film formed on the substrate configuration layer (on the substrate configuration layer 4A) on the side of an intermediate layer 6. The substrate configuration layer 4A includes a base material 5 and the intermediate layer 6. The base material 5 is a plate-shaped member made of, for example, Si (silicon) as a material. A circuit (not shown) for selectively driving the respective discharge elements 2 is formed on the base material 5. The circuit includes a drive element formed by a semiconductor element such as a switching transistor.

The intermediate layer 6 includes a plurality of wiring layers including wiring layers 7A and 7B. The material of the wiring layer is, for example, a material containing aluminum as a main component, and more specifically, for example, AlCu (copper aluminum). The thickness of each of the wiring layers 7A and 7B is, for example, about 0.2 μm to 1.0 μm. The intermediate layer 6 constitutes a heat storage layer formed of, for example, SiO as a main component. The upper surface (the boundary surface with the substrate configuration layer 4B) of the intermediate layer 6 is a flat surface. Note that the element substrate 1 may include a plurality of heat storage layers with wiring layers embedded therein. The thickness of a portion of the intermediate layer 6 above the wiring layers 7A and 7B is, for example, about 0.5 μm to 3.0 μm. Note that the intermediate layer 6 may be formed by providing a plurality of heat storage layers with wiring layers embedded therein.

The substrate configuration layer 4B includes the discharge element 2, an insulating layer 9, a conductive layer 10, and a non-insulated portion 11. The discharge element 2 is a strip-shaped film having a thickness of, for example, about 10 nm to 100 nm, and contains, for example, tantalum silicon nitride (TaSiN) as a main component. The discharge element 2 is arranged on the upper surface (surface) of the planarized intermediate layer 6. When viewed from a direction in which a liquid is discharged from the ink discharge port 32*a*, the discharge element 2 and the wiring layers 7A and 7B are formed at a position where they overlap each other, and a plurality of plugs 8A and 8B (electric connecting portions) connect them. The plugs 8A and 8B are formed in holes (through holes) passing through the wiring layers 7A and 7B, respectively, from the upper surface of the intermediate layer 6. Each of the plugs 8A and 8B includes, for example, a contact metal film in contact with the corresponding one of the wiring layers 7A and 7B, a barrier metal film, and a plug film as a main component. The contact metal film is formed of, for example, titanium (Ti) having a thickness of about 10 nm to 50 nm, and the barrier metal film is formed of, for example, titanium nitride (TiN) having a thickness of about 50 nm to 100 nm. The plug film is formed of, for example, a material such as tungsten (W), copper (Cu), aluminum (Al), or an alloy thereof, and has a film thickness capable of filling the hole.

The wiring layer 7A is arranged at a position where it overlaps one end of the discharge element 2, and the wiring layer 7B is arranged at a position where it overlaps the other end of the discharge element 2. Power supply to the discharge element 2 is performed by, for example, flowing a current in the order of the wiring layer 7A, the plug 8A, the discharge element 2, the plug 8B, and the wiring layer 7B. When a current flows as described above, the discharge element 2 generates heat to foam the ink supplied to the liquid chamber 32*e*, and discharges the ink from the ink discharge port 32*a*.

The insulating layer 9 is a protection layer that covers the flat surface of the upper surface of the substrate configuration layer 4A over the entire region of the arrangement region 4 against each liquid chamber 32*e*. Each discharge element 2 and each non-insulated portion 11 are also covered by the insulating layer 9 against each liquid chamber 32*e*. The insulating layer 9 is a film having a thickness of, for example, about 100 nm to 300 nm and containing silicon nitride (SiN) as a main component.

The conductive layer 10 is an anti-cavitation layer formed on the insulating layer 9 so as to cover the discharge element 2 against the liquid chamber 32*e*. The conductive layer 10 is a film having a thickness of, for example, about 100 nm to 300 nm and containing tantalum (Ta), iridium (Ir), or the like as a main component. In this embodiment, the conductive layer 10 is divided and arranged for each of the discharge elements 2, and each divided conductive layer 10 has a rectangular shape in a planar view. By providing the conductive layer 10 for each element as a protection target, the area of the conductive layer 10 can be reduced, and the probability of ESD strike can be decreased.

A layer 12 is stacked on the insulating layer 9 to ensure the adhesion with the wall portion 32*f* of the flow path forming member 32*b*. The layer 12 is, for example, an SiCN film having a thickness of about 150 nm. A width W1 of the conductive layer 10 is smaller than a width W2 of the liquid chamber 32*e*. The conductive layer 10 is provided only inside the liquid chamber 32*e*, and not in direct contact with the wall portion 32*f*. It is possible to select the material of the conductive layer 10 without considering the adhesion with the flow path forming member 32*b* (wall portion 32*f*). Further, by forming the conductive layer 10 to be thinner and smaller, occurrence of warpage of the element substrate 1 can be reduced.

The non-insulated portion 11 is, for example, an aluminum copper (AlCu) film having a thickness of about 200 nm. The non-insulated portion 11 may be a semiconductor other than a conductor. The non-insulated portion 11 is formed on the side of the intermediate layer 6 of the substrate configuration layer 4A. In this embodiment, particularly, the non-insulated portion 11 is arranged on the upper surface (surface) of the planarized intermediate layer 6. In this embodiment, the non-insulated portion 11 is formed in a strip shape along the discharge element 2. An opening portion 9*a* is formed in the insulating layer 9 at a position which is spaced apart from the discharge element 2 in the substrate surface direction of the element substrate 1 and at which the opening portion 9*a* overlaps the conductive layer 10 and the non-insulated portion 11. The non-insulated portion 11 is connected to the conductive layer 10 via the opening portion 9*a*, and forms a charge-removing path of the conductive layer 10, which serves as a countermeasure against ESD. The opening portion 9*a* is formed between the wall portion 32*f* and the discharge element 2 in the substrate surface direction, so that is can remove electric charged from the conductive layer 10 at a position close to the discharge element 2 in the range of the liquid chamber 32*e*.

That is, for example, if ESD has struck from the ink discharge port 32*a* to the conductive layer 10, by releasing the electric charges from the conductive layer 10 to the non-insulated portion 11, it is possible to reduce occurrence of dielectric breakdown in the insulating layer 9. In this embodiment, a plurality of the opening portions 9*a* are formed in the extending direction of the non-insulated portion 11 extending along an edge portion of the discharge element 2. This can more effectively cause the movement of electric charges from the conductive layer 10 to the non-insulating portion 11.

In this embodiment, the non-insulating portion 11 and the discharge element 2 are formed on the same flat surface of the intermediate layer 6. In addition, a structure is used in which power is supplied to the discharge element 2 from the wiring layers 7A and 7B provided in the intermediate layer 6 via the plugs 8A and 8B located in the normal direction of the discharge element 2. Therefore, the non-insulated portion 11 can be arranged close to the discharge element 2 without interference with the power supply path to the discharge element 2. Even if ESD transfers to the conductive layer 10, it is possible to release electric changes to the non-insulating portion 11 near the discharge element 2. Particularly, comparing to a structure in which the wiring layer for power supply to the discharge element 2 is provided on the upper surface side of the intermediate layer 6, it becomes easy to ensure the degree of freedom in arrangement of the non-insulated portion 11. A shortest distance L between the non-insulated portion 11 and the discharge element 2 is, for example, between 1.0 μm (inclusive) and 20 μm (inclusive). In the illustrated example, the shortest distance L is the distance from the edge of the non-insulating portion 11 to the edge of the discharge element 2 in the substrate surface direction of the element substrate 1.

Second Embodiment

Figure 6:
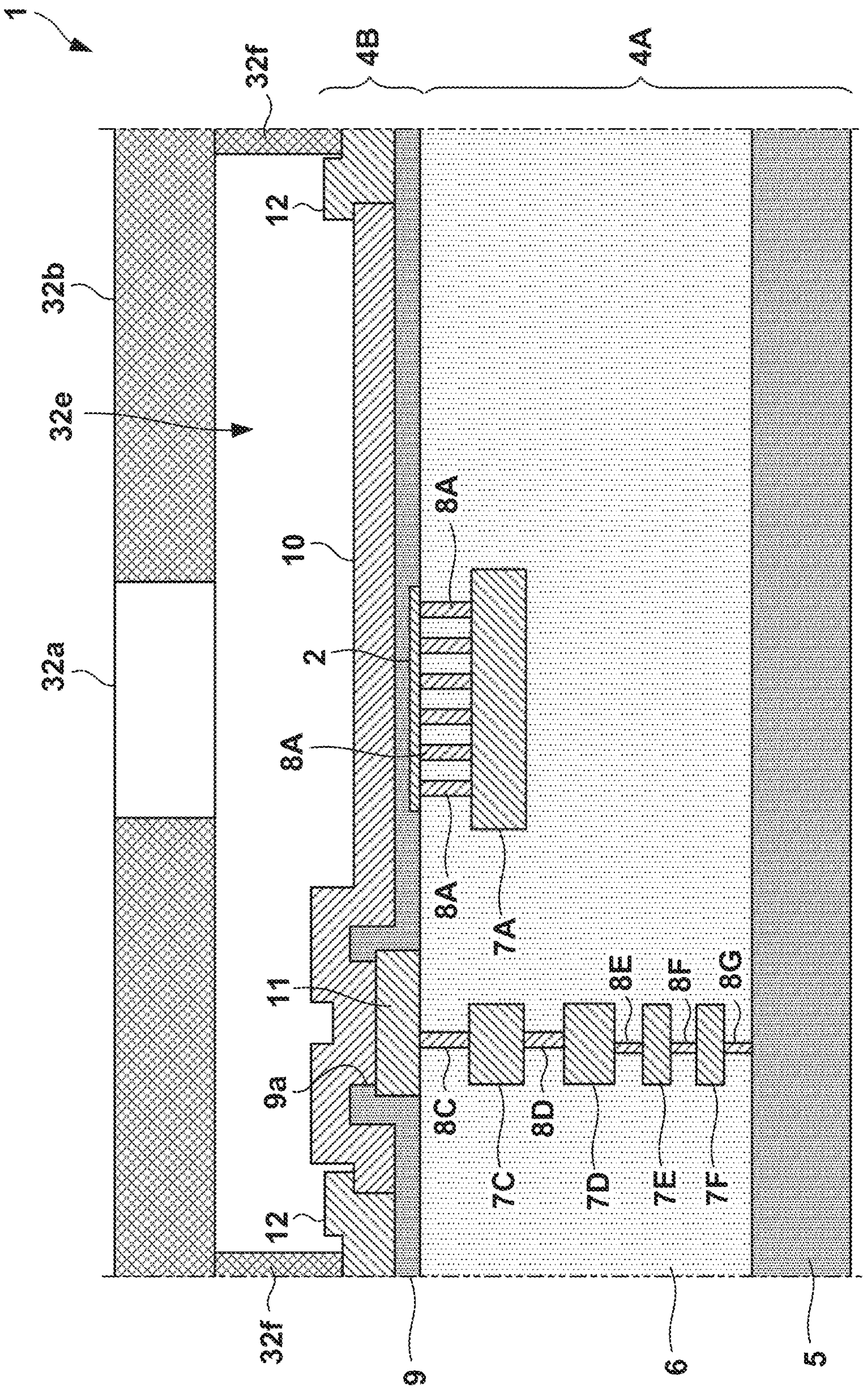
FIG. 6 is a sectional view showing another arrangement example of the element substrate.

By electrically connecting a non-insulated portion 11 to a wiring layer and a base material 5, electric charges can be more readily released from a conductive layer 10, and the protection performance of an insulating layer 9 against ESD can be improved. FIG. 6 is a sectional view of an element substrate 1 showing an example of this arrangement.

In the example shown in FIG. 6, a plurality of wiring layers 7C to 7F are formed in an intermediate layer 6. The total number of layers is four here, but the present invention is not limited to this. Particularly, three or more layers are advantageous in terms of removal of electric charges from the conductive layer 10. The non-insulated portion 11 is electrically connected to the wiring layers 7C to 7F and grounded to the base material 5 via plugs 8C to 8G. If ESD transfers to the conductive layer 10, it is possible to release the electric charge to the wiring layers 7C to 7F and the base material 5.

In addition, from the viewpoint of suppression of a manufacturing load, wiring layers 7A and 7B electrically connected to the discharge element 2 and the wiring layer 7C electrically connected to the non-insulated portion 11 may be formed in the same manufacturing process. In the element substrate 1 formed as described above, the wiring layers 7A and 7B and the wiring layer 7C are provided at the same position (or at the same height) in the substrate surface direction of the element substrate 1. Similarly, plugs 8A and 8B electrically connected to the discharge element 2 and the plug 8C electrically connected to the non-insulated portion 11 may be formed in the same manufacturing process.

Third Embodiment

Figure 7:
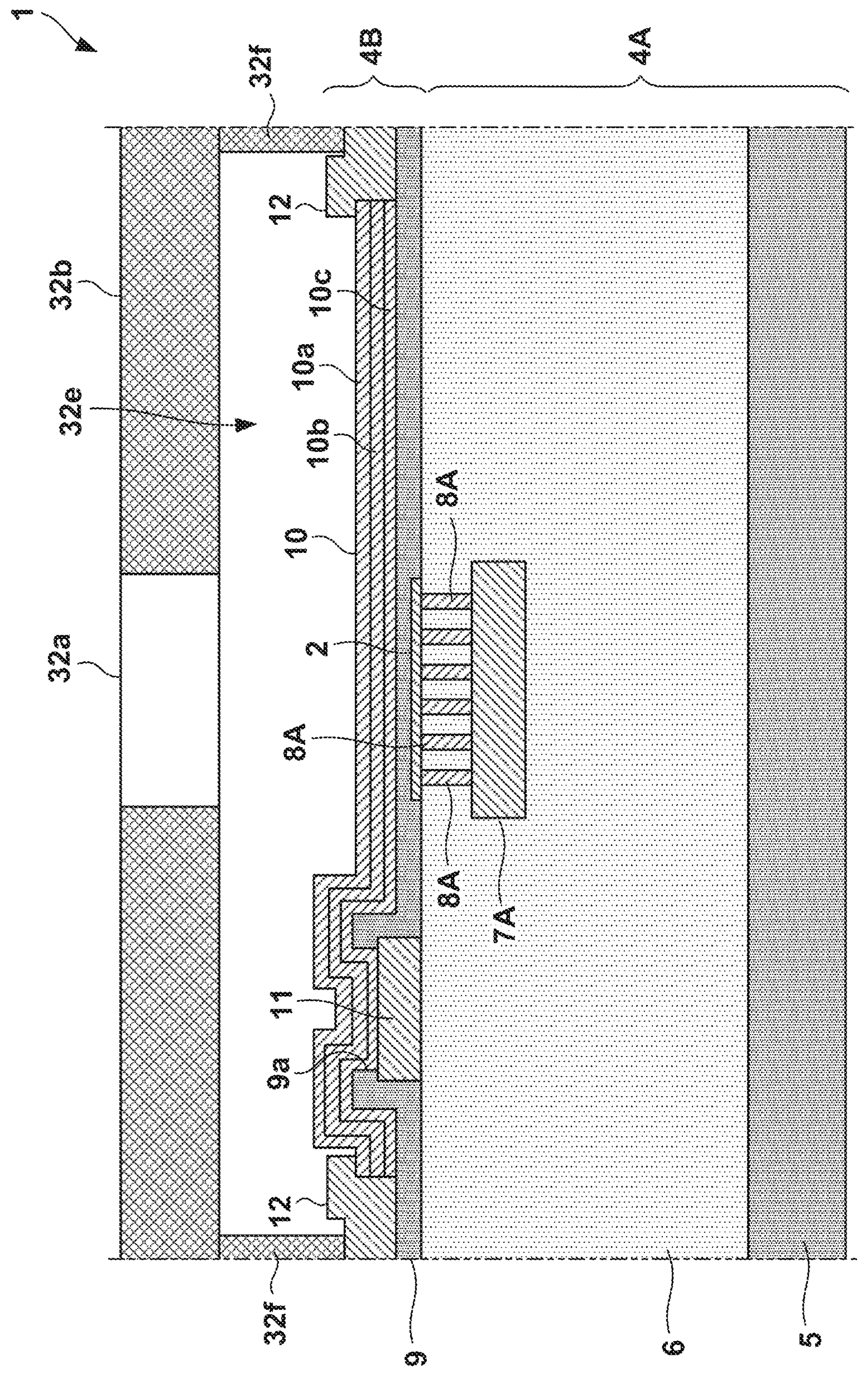
FIG. 7 is a sectional view showing still another arrangement example of the element substrate.

A conductive layer 10 may include a plurality of layers made of different materials. FIG. 7 is a sectional view of an element substrate 1 showing an example of this arrangement. In the example shown in FIG. 7, the conductive layer 10 has a three-layer structure including layers 10*a* to 10*c*, and the total thickness of the conductive layer 10 is, for example, 200 nm. The material of the layer 10*a* is tantalum (Ta), the material of the layer 10*b* is iridium (Ir), and the material of the layer 10*c* is tantalum (Ta). Accordingly, in the example shown in FIG. 7, the conductive layer 10 is formed by the layers made of two kinds of materials. It is possible to form the conductive layer 10 that takes advantage of the characteristics of the respective materials.

Fourth Embodiment

Figure 8A:
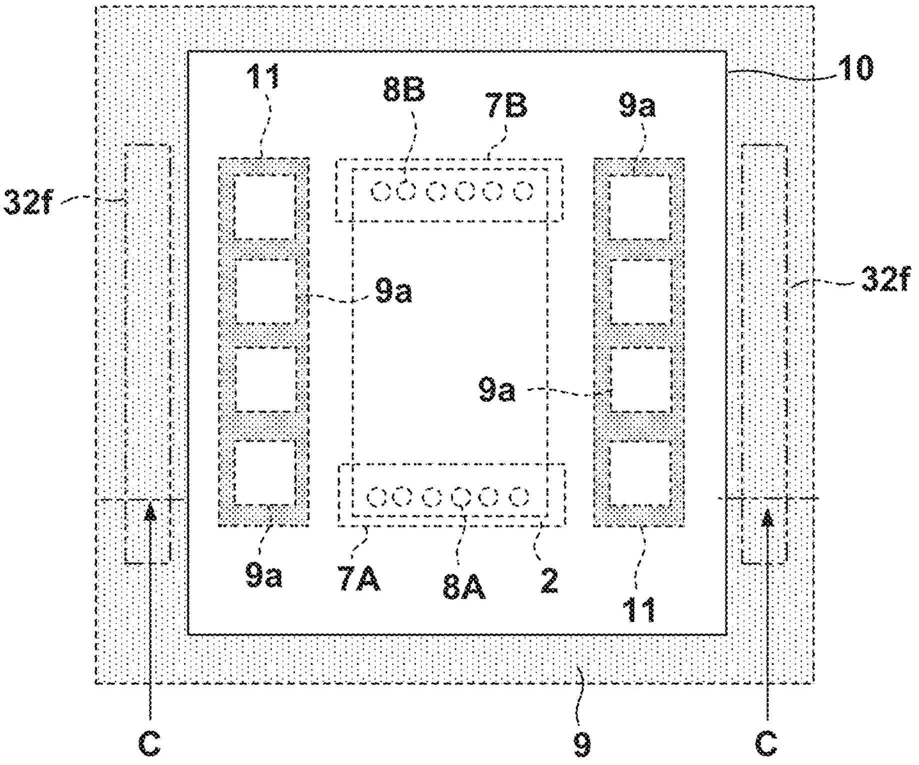
FIG. 8A is a partially enlarged view showing still another arrangement example of the element substrate.
Figure 8B:
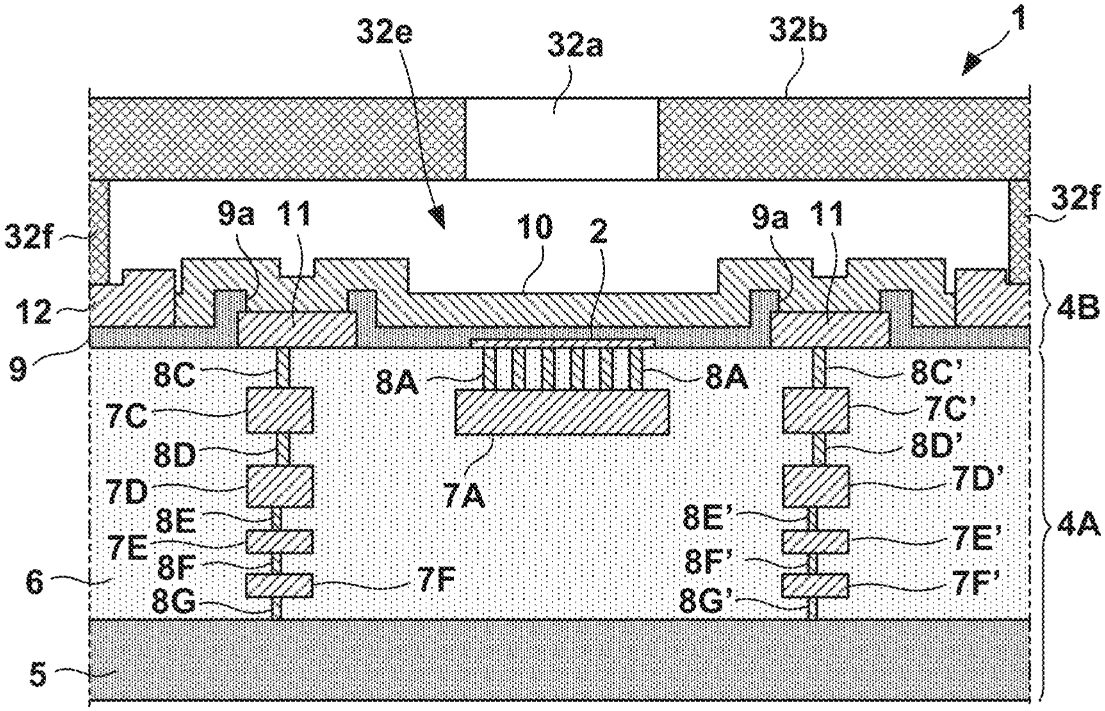
FIG. 8B is a sectional view taken along a line C-C in FIG. 8A.

A plurality of non-insulated portions 11 may be provided in the periphery of a discharge element 2. FIG. 8A is a plan view of an element substrate 1 in the periphery of the discharge element 2, and FIG. 8B is a sectional view taken along a line C-C in FIG. 8A. In the example shown in FIGS. 8A and 8B, a total of two non-insulated portions 11 are formed on the both sides of the discharge element 2 in the substrate surface direction so as to sandwich the discharge element 2. Each of the non-insulated portions 11 extends in a strip shape in the substrate surface direction and along the discharge element 2 so as to be parallel to each other. An opening portion 9*a* is formed for each non-insulated portion 11, and connected to a conductive layer 10 and each non-insulated portion 11. If ESD strikes to the conductive layer 10, it is possible to release electric charges to the two non-insulated portions 11, so that dielectric breakdown can be further reduced.

In the example shown in FIG. 8B, as in the second embodiment, the non-insulated portion 11 is electrically connected to wiring layers and a base material 5. One non-insulated portion 11 is electrically connected to wiring layers 7C to 7F and grounded to the base material 5 via plugs 8C to 8G. The other non-insulated portion 11 is electrically connected to wiring layers 7C' to 7F' and grounded to the base material 5 via plugs 8C' to 8G. If ESD strikes to the conductive layer 10, it is possible to release electric charges to the wiring layers 7C to 7F and 7C' to 7F' and the base material 5.

Figure 9:
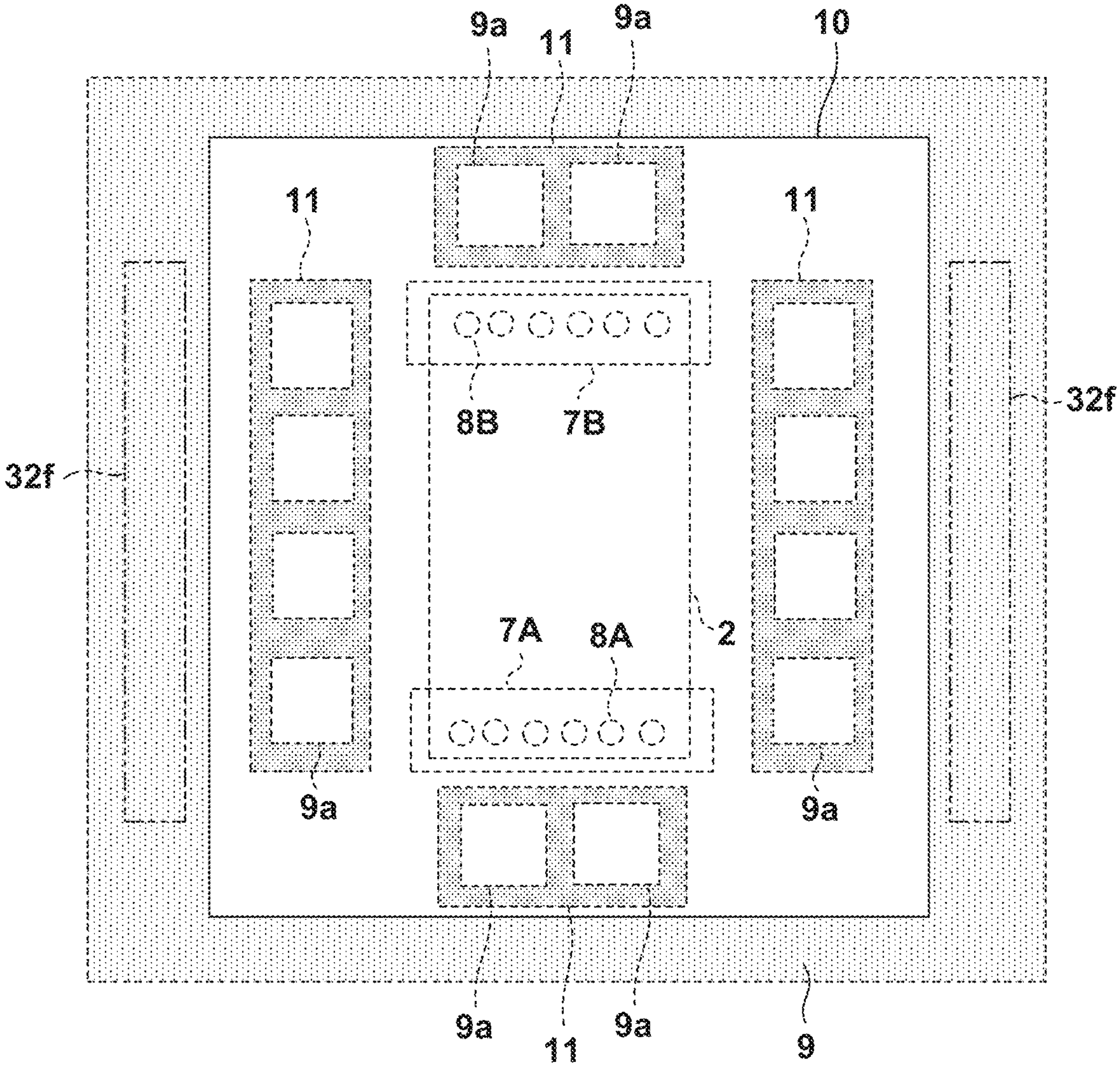
FIG. 9 is a partially enlarged view showing still another arrangement example of the element substrate.

The number of the non-insulated portions 11 is not limited to two. In the example shown in FIG. 9, four non-insulated portions 11 are provided and arranged on four sides of the discharge element 2 in the substrate surface direction so as to surround the discharge element 2. Electric charges are readily released from the conductive layer 10 to the respective non-insulated portions 11, so that dielectric breakdown can be further reduced.

Fifth Embodiment

Figure 10A:
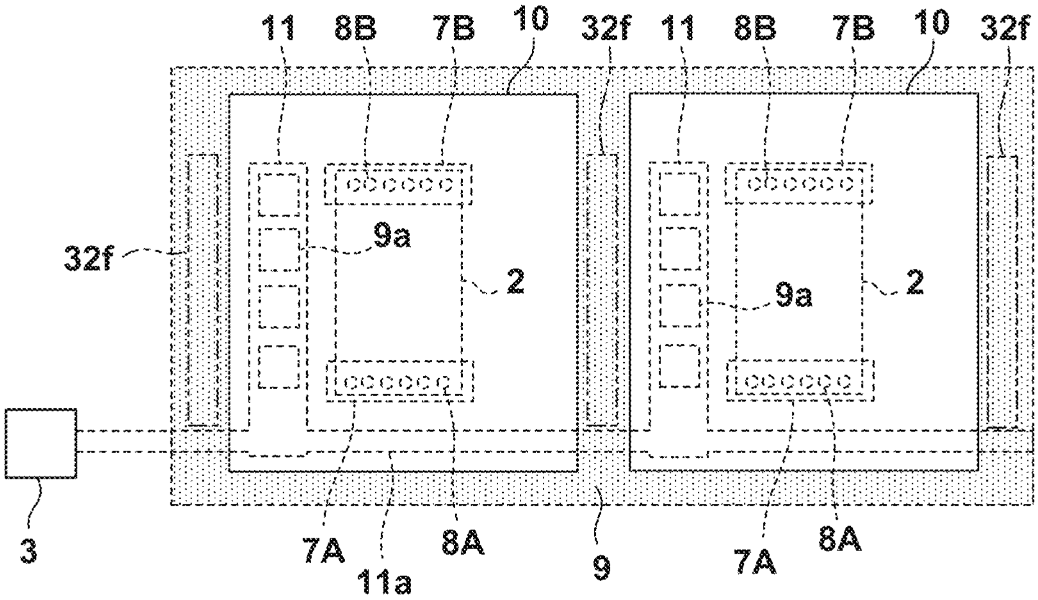
FIGS. 10A and 10B are views each showing still another arrangement example of the element substrate.

A non-insulated portion 11 may be electrically connected to an electrode pad 3. FIG. 10A shows an example of this arrangement. The non-insulated portion 11 is connected to the electrode pad 3 via a wiring layer 11*a*. The non-insulated portions 11 adjacent to each other are also connected to each other by the wiring layer 11*a*. For example, the wiring layer 11*a* is formed on the planarized upper surface of an intermediate layer 6, and extends in the substrate surface direction. With this, the wiring layer 11*a* and the electrode pad 3 can be formed in the same layer. The wiring layer 11*a* is covered by an insulating layer 9.

By grounding the electrode pad 3, a conductive layer 10 is grounded via the non-insulated portion 11 and the wiring layer 11*a*. In this embodiment, when grounding the conductive layer 10, it is unnecessary to form a charge-removing path in the intermediate layer 6 in the thickness direction, so that the degree of freedom in arrangement of the wiring layer in the intermediate layer 6 can be improved. In addition, by connecting the non-insulated portions 11 adjacent to each other by the wiring layer 11*a*, in the arrangement in which a plurality of the conductive layers 10 are grounded using the electrode pads 3, the number of the wiring layers 11*a* and the number of the electrode pads 3 can be decreased.

Figure 10B:
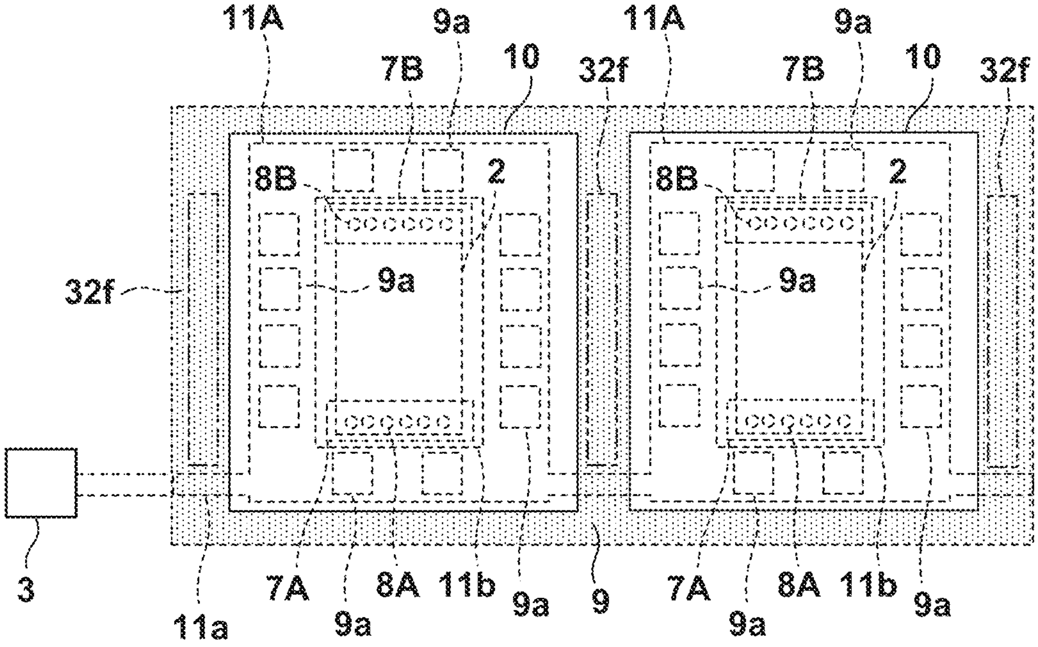

FIG. 10B shows another example. In the example shown in FIG. 10B, a non-insulated portion 11A is annularly formed so as to surround a discharge element 2. The non-insulated portion 11A is connected to the electrode pad 3 via the wiring layer 11*a*. The non-insulated portions 11A adjacent to each other are also connected to each other by the wiring layer 11*a*. For example, the wiring layer 11*a* is formed on the planarized upper surface of the intermediate layer 6, and extends in the substrate surface direction. The wiring layer 11*a* is covered by the insulating layer 9. When the non-insulated portion 11A is formed so as to surround the discharge element 2, electric charges are readily released from the conductive layer 10 to the non-insulated portions 11A, so that dielectric breakdown can be further reduced.

Sixth Embodiment

Figure 11:
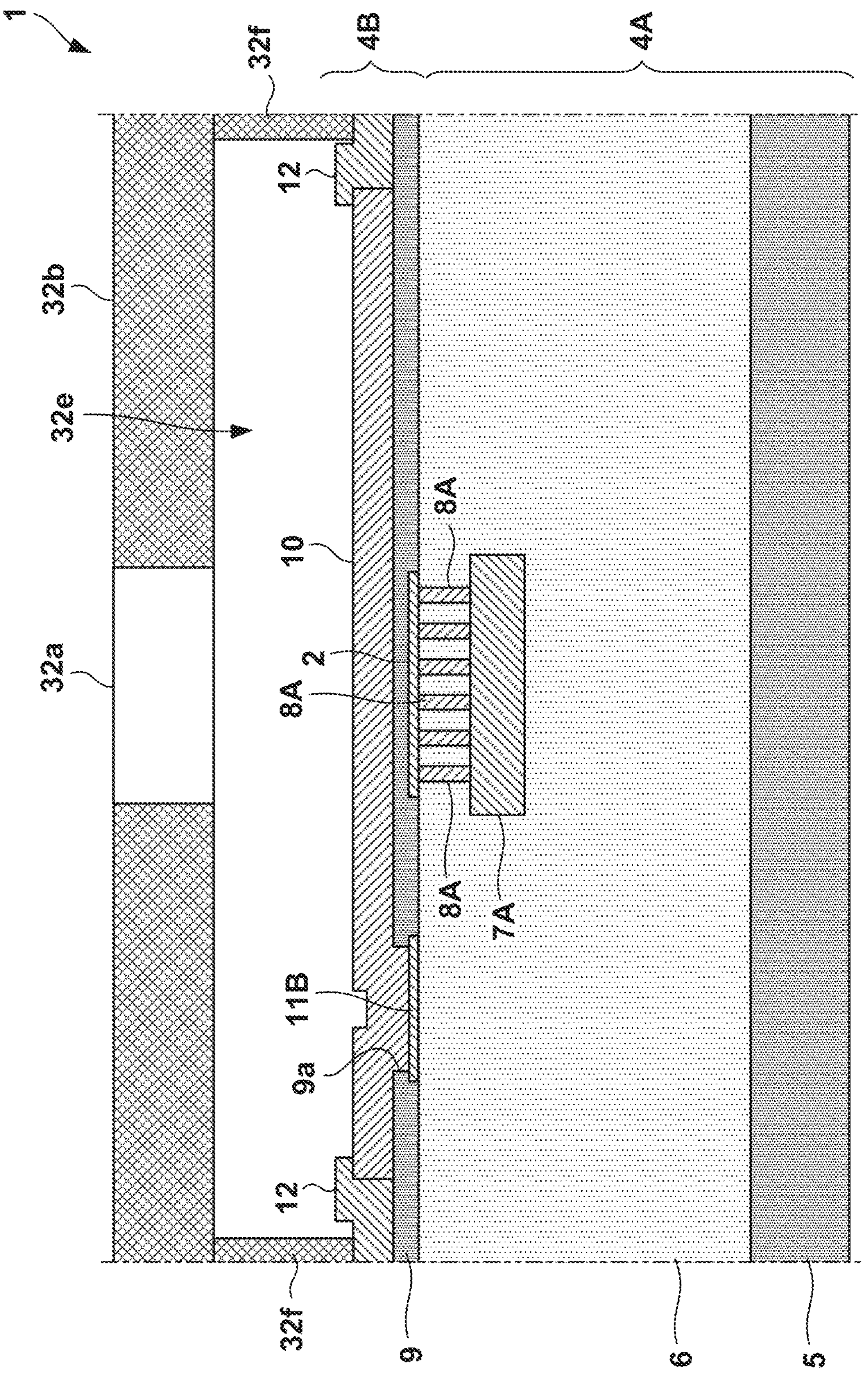
FIG. 11 is a sectional view showing still another arrangement example of the element substrate.

A non-insulated portion 11 may be formed of the same material as a discharge element 2. FIG. 11 shows an example of this arrangement. A non-insulated portion 11B shown in FIG. 11 is formed of the same material as the discharge element 2 and formed to have the same film thickness (for example, 20 nm) as the discharge element 2. In the manufacturing process of an element substrate 1, it is also possible to simultaneously form the non-insulated portion 11B and the discharge element 2 in the same layer, so that the productivity of the element substrate 1 can be improved.

Since the non-insulated portion 11B has the same film thickness as the discharge element 2, the step between each of an insulating layer 9 and a conductive layer 10 and the periphery in the non-insulated portion 11B can be decreased. Since the flatness of the conductive layer 10 is improved as a whole, the flow path resistance to ink can be reduced in a liquid chamber 32*e*. Since the flatness of the insulating layer 9 is improved, the non-insulated portion 11B and the discharge element 2 can be spaced apart from each other but arranged at a closer distance.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-064795, filed Apr. 6, 2021, which is hereby incorporated by reference herein in its entirety.

What is claimed is:

1. A liquid discharge head substrate comprising:

a substrate configuration layer including a base material and an intermediate layer including a wiring layer;

an element formed on a side of the intermediate layer of the substrate configuration layer, and configured to generate energy for discharging a liquid in accordance with supply of power from the wiring layer;

an insulating layer covering the element and the substrate configuration layer against a liquid chamber including a discharge port configured to discharge the liquid;

a conductive layer formed on the insulating layer so as to cover the element against the liquid chamber;

an electric connecting portion configured to electrically connect the wiring layer and the element;

a non-insulated portion formed on a side of the intermediate layer of the substrate configuration layer and configured to be covered by the insulating layer against the liquid chamber; and an opening portion formed in the insulating layer at a position which is spaced apart from the element and where the opening portion overlaps the conductive layer and the non-insulated portion when viewed from a direction in which the liquid is discharged from the discharge port, wherein the non-insulated portion is connected to the conductive layer via the opening portion, and the wiring layer and the element are formed so as to overlap each other when viewed from the direction.

2. The substrate according to claim 1, wherein the opening portion is formed at a position between a wall portion that defines the liquid chamber and the element.

3. The substrate according to claim 1, comprising a plurality of elements, each of which is the element, wherein the conductive layer is divided and arranged for each of the elements.

4. The substrate according to claim 1, wherein a width of the conductive layer is smaller than a width of the liquid chamber.

5. The substrate according to claim 1, wherein the electric connecting portion is a plug formed in a through hole passing through between the wiring layer and the element in the intermediate layer.

6. The substrate according to claim 1, wherein the non-insulated portion is electrically connected to the base material.

7. The substrate according to claim 1, wherein the intermediate layer includes a plurality of wiring layers, and the plurality of wiring layers include the wiring layer used to supply power to the element, and a wiring layer to which the non-insulated portion is electrically connected.

8. The substrate according to claim 1, further comprising an electrode pad connected to the non-insulated portion.

9. The substrate according to claim 1, wherein the substrate configuration layer includes a flat surface, and the non-insulated portion and the element are formed on the flat surface.

10. The substrate according to claim 9, wherein the element is a heat generating resistive element, and the non-insulated portion is formed of the same material as the heat generating resistive element.

11. The substrate according to claim 1, wherein the conductive layer includes a plurality of layers made of different materials.

12. The substrate according to claim 1, wherein the element and the non-insulated portion are spaced apart from each other by a distance of 20 μm or less in a shortest distance.

13. The substrate according to claim 1, wherein the non-insulated portion extends in a substrate surface direction of the substrate, and a plurality of opening portions, each of which is the opening portion are formed in the insulating layer.

14. The substrate according to claim 13, wherein the plurality of opening portions are provided along an edge portion of the element.

15. The substrate according to claim 1, wherein a plurality of the non-insulated portions are arranged in a periphery of the element, and a plurality of opening portions, each of which is the opening portion are formed in the insulating layer.

16. The substrate according to claim 15, wherein the plurality of opening portions are provided along an edge portion of the element.

17. The substrate according to claim 1, wherein the non-insulated portion is provided so as to surround the element, and a plurality of opening portions, each of which is the opening portion are formed in the insulating layer.

18. The substrate according to claim 17, wherein the plurality of opening portions are provided along an edge portion of the element.

19. A printing apparatus comprising a printhead configured to discharge ink to a print medium, the printhead comprising a substrate and the substrate comprising:

a substrate configuration layer including a base material and an intermediate layer including a wiring layer;

an element formed on a side of the intermediate layer of the substrate configuration layer, and configured to generate energy for discharging the ink in accordance with supply of power from the wiring layer;

an insulating layer covering the element and the substrate configuration layer against a liquid chamber including a discharge port configured to discharge the ink;

a conductive layer formed on the insulating layer so as to cover the element against the liquid chamber;

an electric connecting portion configured to electrically connect the wiring layer and the element;

a non-insulated portion formed on a side of the intermediate layer of the substrate configuration layer and covered by the insulating layer against the liquid chamber; and an opening portion formed in the insulating layer at a position which is spaced apart from the element and where the opening portion overlaps the conductive layer and the non-insulated portion when viewed from a direction in which the liquid is discharged from the discharge port, wherein the non-insulated portion is connected to the conductive layer via the opening portion, and the wiring layer and the element are formed so as to overlap each other when viewed from the direction.

* * * * *